United States Patent [19]

Kyushima

[11] Patent Number: 4,989,145
[45] Date of Patent: Jan. 29, 1991

[54] SYNTAX ANALYSIS AND LANGUAGE PROCESSING SYSTEM

[75] Inventor: Ichiro Kyushima, Yokohama, Japan

[73] Assignee: Hitachi, Ltd., Tokyo, Japan

[21] Appl. No.: 408,750

[22] Filed: Sep. 18, 1989

[30] Foreign Application Priority Data

Sep. 19, 1988 [JP] Japan .................. 63-232376

[51] Int. Cl.⁵ .......................................... G06F 11/00
[52] U.S. Cl. .................................. 364/419; 364/200
[58] Field of Search ............... 364/419, 900 MS File, 364/200 MS File, 300

[56] References Cited

U.S. PATENT DOCUMENTS 4,819,233 4/1989 Delucia et al. .................. 364/200

FOREIGN PATENT DOCUMENTS 0189239 11/1982 Japan .

OTHER PUBLICATIONS

K. Hammond, et al., "A Survey on Syntactic Error Recovery an Repair", Computer Language, 1984, vol. 9, No.1, pp. 51-67.

A. V. Aho, et al., "Compilers, Principles, Techniques, and Tools", Addison-Wesley Publishing Company, pp. 26-29, 195-200.

Primary Examiner—Jerry Smith
Assistant Examiner—David M. Huntley
Attorney, Agent, or Firm—Fay, Sharpe, Beall, Fagan, Minnich & McKee

[57] ABSTRACT

A system for analyzing syntax in a language processing system includes a memory which stores preselected indentation rules associated with a source code level language. A lexical analyzer reads a sequence of input symbols from the source code, and divides them into tokens, which tokens form sequences of symbols having a collective meaning. A syntax analyzer receives information from the tokens and compares the same to indentation rules stored in the memory. Source code correction, suggested source code correction, or warnings indicative of improper identation are selectively generated in accordance with an output of the syntax analyzer.

14 Claims, 8 Drawing Sheets

| | | | |
|---|---|---|---|
| (1) | < program > | ::= | < block > |
| (2) | < block > | ::= | < variable declaration > < procedure declaration sequence > |
| | | | \| < statement > |
| (3) | < variable declaration > | ::= | var < variable sequence > |
| (4) | | | \| ε |
| (5) | < variable sequence > | ::= | < identifier > |
| (6) | | | \| < identifier >, < variable sequence > |
| (7) | < procedure declaration sequence > | ::= | < procedure declaration > |
| (8) | | | \| < prodecure declaration > < procedure declaration sequence > |
| (9) | | | \| ε |
| (10) | < procedure declaration > | ::= | procedure < identifier >; < block >; |
| (11) | < statement > | ::= | < identifier > := < expression > |
| (12) | | | \| call < identifier > |
| (13) | | | \| begin < statement sequence > end |
| (14) | | | \| if < condition > then < statement > else < statement > |
| (15) | | | \| while < condition > do < statement > |
| (16) | < statement sequence > | ::= | < statement > |
| (17) | | | \| < statement >; < statement sequence > |
| (18) | < condition > | ::= | < expression > = < expression > |
| (19) | | | \| < expression > < > < expression > |
| (20) | | | \| < expression > < < expression > |
| (21) | | | \| < expression > >> < expression > |
| (22) | < expression > | ::= | < term > + < term > |
| (23) | | | \| < term > − < term > |
| (24) | < term > | ::= | < factor > * < factor > |
| (25) | | | \| < factor > / < factor > |
| (26) | < factor > | ::= | < identifier > |
| (27) | | | \| < number > |
| (28) | | | \| < expression > |

FIG. 3

```
(1)   <program>°            ::= <block>°
(2)   <block>°              ::= <variable declaration>°
                                <procedure declaration
                                  sequence>°
                                <statement>°
(3)   <variable declaration>° ::= var°<variables sequence>;
(4)                           | E
(5)   <procedure declaration  ::= <procedure declaration>°
       sequence>°
(6)                           | <procedure declaration>°
                                <procedure declaration
                                  sequence>°
(7)                           | E
(8)   <procedure declaration>° ::= procedure°<identifier> ¡
                                   <block>° ;
(9)   <statement>°            ::= <identifier>° :=
                                  <expression>
(10)                          | call°<identifier>
(11)                          | begin°<statement
                                  sequence>¹end°
(12)                          | if°<condition> then
                                  <statement>¹
                                  else°<statement>¹
(13)                          | while°<condition> do
                                  <statement>¹
(14)  <statement sequence>°   ::= <statement>°
(15)                          | <statement>° ;
                                <statement sequence>°
```

START
↓
(81) GENERATION OF PROPOSED SETS OF CORRECT PROGRAM TOKEN STRINGS
↓
(82) SELECTION OF OPTIMUM SET FROM PROPOSED ONES
↓
(83) ALTERATION OF CONTENTS OF TOKEN QUEUE AND STACK FOR SYNTAX ANALYSIS
↓
(84) OUTPUT OF ERROR INFORMATION
↓
END

FIG. 9

```
(1)  VAR S;
(2)  PROCEDURE SUM;
(3)   VAR I;
(4)   BEGIN
(5)     S := 0;
(6)     I := 1;
(7)     WHILE I < 10 DO
(8)       S := S + 1;
(9)       I := I + 1;
(10)    END;
(11)    CALL WRITE
(12)  END;
```

FIG. 11a

```
(1)  VAR S;
(2)  PROCEDURE SUM;
(3)   VAR I;
(4)   BEGIN
(5)     S := 0;
(6)     I := 1;
(7)     WHILE I < 10 DO
(8)       S := S + 1;
(9)       I := I + 1;
(10)    CALL WRITE
(11)  END;
```

FIG. 11b

```
(1)  VAR S;
(2)  PROCEDURE SUM;
(3)   VAR I;
(4)   BEGIN
(5)     S := 0;
(6)     I := 1;
(7)     WHILE I < 10 DO
(8)      ⁻S := S + 1;
(9)      .I := I + 1;
(10)     ^--- WARNING; ILLEGAL
                      INDENTATION
(11)    CALL WRITE
(12)  END;
```

FIG. 10a

```
(1)  VAR S;
(2)  PROCEDURE SUM;
(3)   VAR i;
(4)   BEGIN
(5)     S := 0;
(6)     i := 1;
(7)     WHILE i < 10 DO
(8)       S := S + 1;
(9)       i := i + 1
(10)  END;
```

FIG. 10b

```
(1)  VAR S;
(2)  PROCEDURE SUM;
(3)   VAR i;
(4)   BEGIN
(5)     S := 0;
(6)     i := 1;
(7)     WHILE i < 10 DO
(8)       S := S + 1;
(9)       i := i + 1
(10)    ;
(11)    CALL WRITE
(12)  END;
```

FIG. 10c

```
(1)  VAR S;
(2)  PROCEDURE SUM;
(3)   VAR i;
(4)   BEGIN
(5)     S := 0;
(6)     i := 1;
(7)     WHILE i < 10 DO
(8)       S := S + 1;
(9)     BEGIN
(10)      i := i + 1
(11)    END;
(12)    CALL WRITE
(13)  END;
```

FIG. 10d

```
(1)  VAR S;
(2)  PROCEDURE SUM;
(3)   VAR i;
(4)   BEGIN
(5)     S := 0;
(6)     i := 1;
(7)     WHILE i < 10 DO
(8)     BEGIN
(9)       S := S + 1;
(10)      i := i + 1
(11)    END;
(12)    CALL WRITE
(13)  END;
```

FIG. 12

SYNTAX ANALYSIS AND LANGUAGE PROCESSING SYSTEM

BACKGROUND OF THE INVENTION

The present invention relates generally to a syntax analysis method in a programming language processing system, and more specifically to a language processing system utilizing this method.

In typical syntax analysis, processing is conducted in a compiler, or the like. Analysis processing in such systems is not ended, even at a point of time when a syntax error contained in an inputted program is detected. Error recovery processing, such as skipping over some extent of the program or inserting appropriate words or phrases in the program, is executed in accordance with the situation of occurrence of the syntax error, so as to continue the analysis processing. This technique is exemplified in Computer Language, Vol. 9, No. 1 (1984), pp. 51 to 67.

In conventional methods including this technique, a language syntax rule forms a basis for determining a type of recovery processing to be conducted. A word or phrase that is expected to appear dictates what syntax element should be supplemented to continue an analysis, when any syntax error is detected.

In the above-described conventional techniques, no consideration is given to the way of giving an indentation (called indention or stepping as well) to the program on the occasion when a method of error recovery is determined.

Free format programming languages allow for the start of a new paragraphs or the insertion of spaces to be freely made between words or phrases. A programmer is often left with the decision as to which indentation should be applied to a given program. The programmer decides where new paragraphs should be started and spacing for commencement of new line (how much the line is indented), for the purpose of improving the easiness-to-read of the program (although no rule is stipulated for these matters in the syntax). An example of this rule is found in structured or block-type languages such as Pascal, LISP, or PROLOG. In Pascal, for example, "begin" and "end" represent a beginning and the end of a block, respectively. A sequence of statements belonging to such a block are written with the same indentation. Any block nested deeper is typically indented further to the right (an indent is increased).

The present invention provides an improved system of accomplishing compilation or execution of software notwithstanding a presence of coding errors. The invention recognizes that spacing and indention of program source code, which provides useful information to human programmers for understanding program structure and flow, may also be seized upon as a source of information with which program debugging may be accomplished by a processor.

Accordingly, the subject invention provides an improved compiler, interpreter, or processor which can correctly compile, correct, or execute code which was heretofore required the expenditure of additional man-hours. A software creation system is therefore provided which has increased reliability, lower cost, and increased throughput.

SUMMARY OF THE INVENTION

In accordance with the present invention, there is taught a system in which coding indentation is given in conformity with a selected rule. With this additional information, a rational computation of an operation intended by a programmer is suitably made, even in the event the program contains one or more syntax errors.

A syntax analysis system includes a storage means to store a selected indentation rule of a programming language to be analyzed, and with a storage means to store information on word or phrase indentation. It determines a method of recovery from a syntax error on the basis of the aforesaid information and the aforesaid rule in addition to a syntax rule when the error is detected in the program.

In accordance with another aspect of the present invention, a means is provided in which to store the indentation rule of the programming language to be analyzed, a determination means to determine whether the input program conforms to the aforesaid rule, and an output means to output a message when the program does not conform to the rule, on the basis of the above-mentioned determination.

In accordance with a more limited aspect of the present invention, a language processing system includes a lexical analyzer and a syntax analyzer. The lexical analyzer reads a sequence of input symbols forming a source code program, and divides them into "tokens." Such tokens are a sequence of symbols having a collective meaning. The syntax analyzer receives, from lexical analyzer, tokens and information as to how much the tokens are indented on a program (e.g. information on the starting positions of tokens). The analyzer executes syntax analysis while storing the information in the storage means such as a stack. A determination of a particular processing to be conducted for error recovery is made on the basis of the information, and an indentation rule, when a syntax error is detected.

An advantage of the present invention is the provision of a system for attaining recovery from syntactical errors by using information on the state of indentations of a program, when such a syntax error is detected.

A program may often contain errors as defined under a preselected indentation rule, even if the program contains no syntax errors. An advantage of the present invention is the provision of a system to furnish a language processing system which has a function to detect such errors and warn a user of them.

The subject system therefore teaches a system with which to undertake a processing of error recovery corresponding to the way of giving an indentation to the program. By providing the analyzer with the determination means to determine whether an input token string conforms to the indentation rule and the output means of a message, a warning message is advantageously outputted in the case when the indentation rule is violated.

BRIEF DESCRIPTION OF THE DRAWINGS

The subject invention will be described in conjunction with a set of figures wherein the illustrations are for the purpose of illustrating the preferred embodiment of the invention only, and not for the purpose of limiting the same wherein:

FIG. 2 is an illustration of a syntax rule of a programming language which is processed by the compiler of the present embodiment;

FIG. 4, which consists of FIGS. 4(a) and 4(b), is an illustrating of the state wherein a program is divided into tokens and put in a token queue;

FIG. 7, which consists of FIGS. 7(a)–7(c), is an illustration of the state of a reducing operation;

FIG. 11, which consists of FIGS. 11(a) and 11(b), is an illustration of an example of a program being contrary to an indentation rule and an example of a warning message given to the violation.

DETAILED DESCRIPTION OF THE PREFERRED EMBODIMENT

Turning now to the figures, an embodiment of the present invention will be described by using FIGS. 1 to 11.

Figure 1:
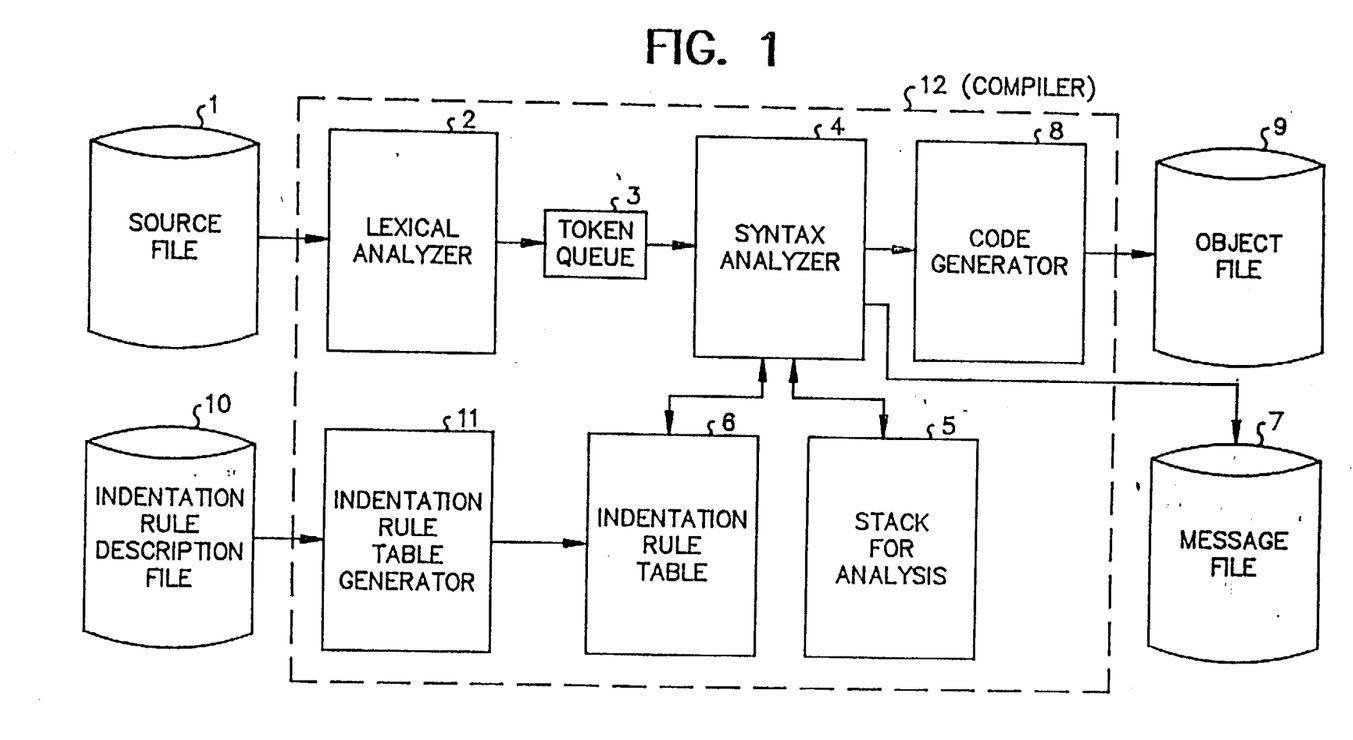
FIG. 1 is a block of a compiler to which a syntax analysis system of the present invention is applied.

FIG. 1 is a block diagram of a compiler to which the syntax analysis system of the present invention is adapted. This compiler functions to accomplish an outputting of an error message for a program which is not in conformity with an indentation rule, although being correct in terms of a syntax.

A source file 1 stores a program to be compiled. A lexical analyzer 2 reads out this program, divides an input symbol string into tokens, and inputs them to a token queue, as will be described with more particularity below. A syntax analyzer 4 executes syntax analysis in accordance with a token string in the token queue 3, so as to generate an intermediate code. A stack 5 is used for the syntax analysis and an indentation rule table 6 is provided wherein an indentation rule is stored. When a syntax error or the violation of a selected indentation rule is detected, selected recovery processing is executed and an error information is written to a message file 7. A code generator 8 converts the intermediate code delivered from the syntax analyzer 4 into object code and outputs the same to an object file 9. As for the contents of the indentation rule table 6, an indentation rule table generator 11 reads an indentation rule description file 10 and prepares the contents beforehand.

FIG. 2 shows a syntax rule of a programming language processed by the compiler of the present embodiment. The syntax rule is suitably represented by BNF (Backus-Naur Form). Attention is drawn to Aho, Alfred V, et al., "Compilers, Principles, Techniques and Tools," pp. 26–29, noted above, the contents of which are incorporated herein by reference, and wherein the meanings of BNF and its associated terminology are explained.

Figure 3:
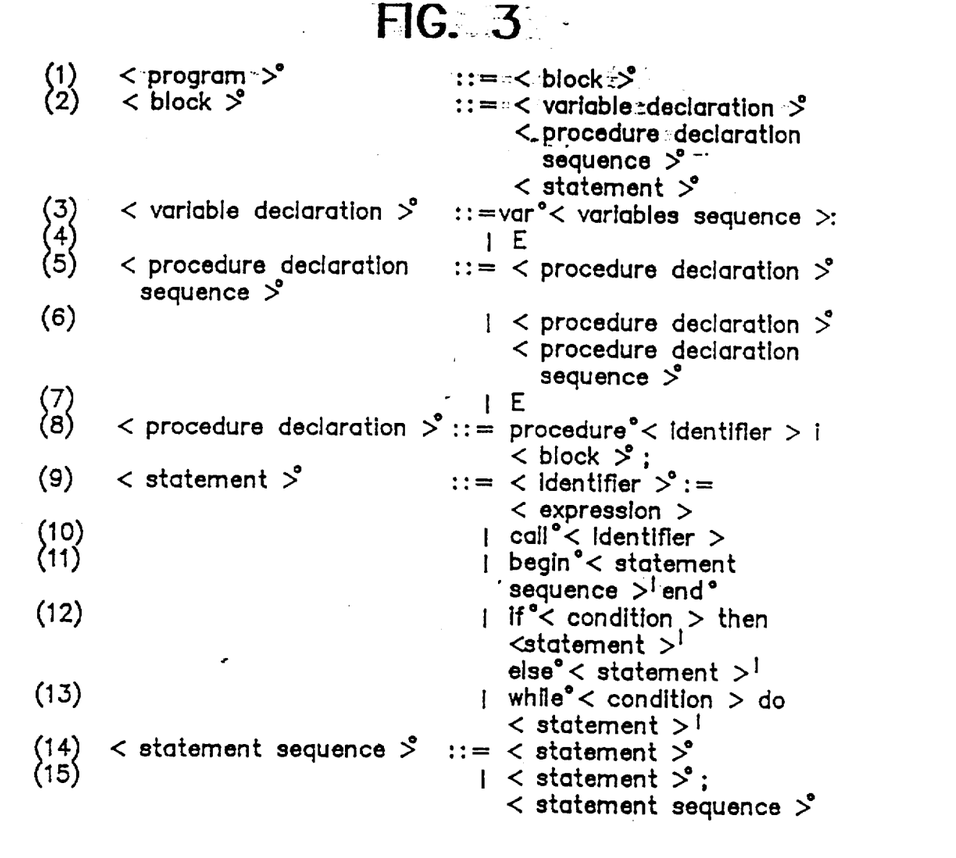
FIG. 3 is an illustration of an indentation rule.

FIG. 3 shows an indentation rule of the programming language processed by the compiler of the present embodiment, for each syntax rule. The way of indentation is shown by a numeral given to the right shoulder of each symbol. Parenthesized numerals show a levels of indentation. In other words, the numbers dictate how far symbols should be indented from the beginning of a line. A larger numeral means a larger indentation (i.e. meaning that the symbol should be put in writing further to the right). These numerals represent relative level differences from indentation levels of symbols on the left side of BNF. For instance, the rule of FIG. 3(11) means that the indentation levels of "begin" and "end" are made equal to that of <statement>, and that the indentation level of <statement sequence> is made higher yet. Symbols having no superscripted numerals appended thereto should not be in the head of a line or those positions whereat they are to be written are not regulated. Information such as that shown in FIG. 3 is stored beforehand in the indentation description file 10.

Figure 4A:
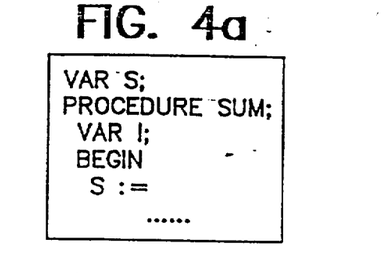
Figure 4B:
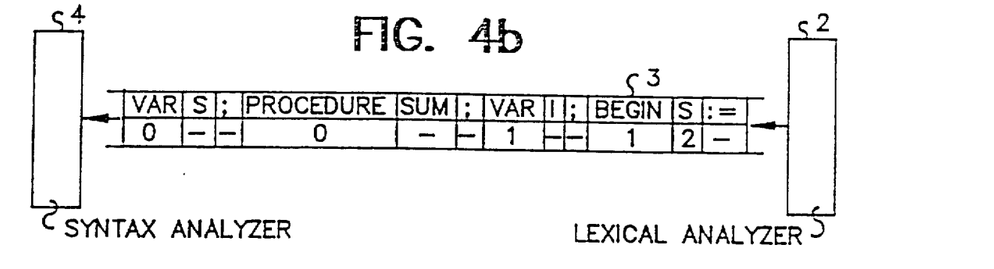

Next, a description will be made on the token queue 3 by using FIG. 4. The token queue is a storage area based on an FIFO (First-In First-Out) system. The token queue is used for delivering the tokens divided by the lexical analyzer 2 to the syntax analyzer 4. Each element of the token queue includes a token and a numeral representing the indentation level of the token. The token queue has such contents as shown in FIG. 4(b) when a program as shown in FIG. 4(a) is processed by the lexical analyzer 2. In this figure, a sign "-" in a field containing the indentation level means that the token having this sign is not present at the head of a line.

Next, a description will be made on the syntax analyzer 4 by using FIGS. 5 to 11.

Figure 5:
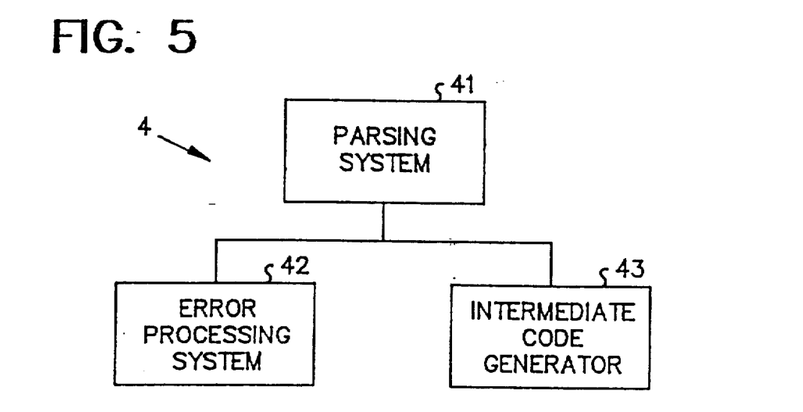
FIG. 5 is a connection diagram of a module of a syntax analyzer.

FIG. 5 is a diagram of connection of a module of the syntax analyzer 4. The syntax analyzer comprises three components of a parsing system 41, an error processing system 42 and an intermediate code generator 43. Syntax analysis is conducted by the parsing system 41 during a time when an input token string conforms to the syntax rule, and the intermediate code generator is called at an appropriate time point to generate an intermediate code. In the case when the input token string contains a syntax error and the analysis can not be advanced further in a normal manner, on the other hand, the error processing system 42 is called. In the error processing system, the contents of the stack 5 for syntax analysis or the token queue 3 are modified so that a normal syntax analysis may be restarted. Appropriate error information is outputted and thereafter the control is returned to the parsing system.

Figure 6:
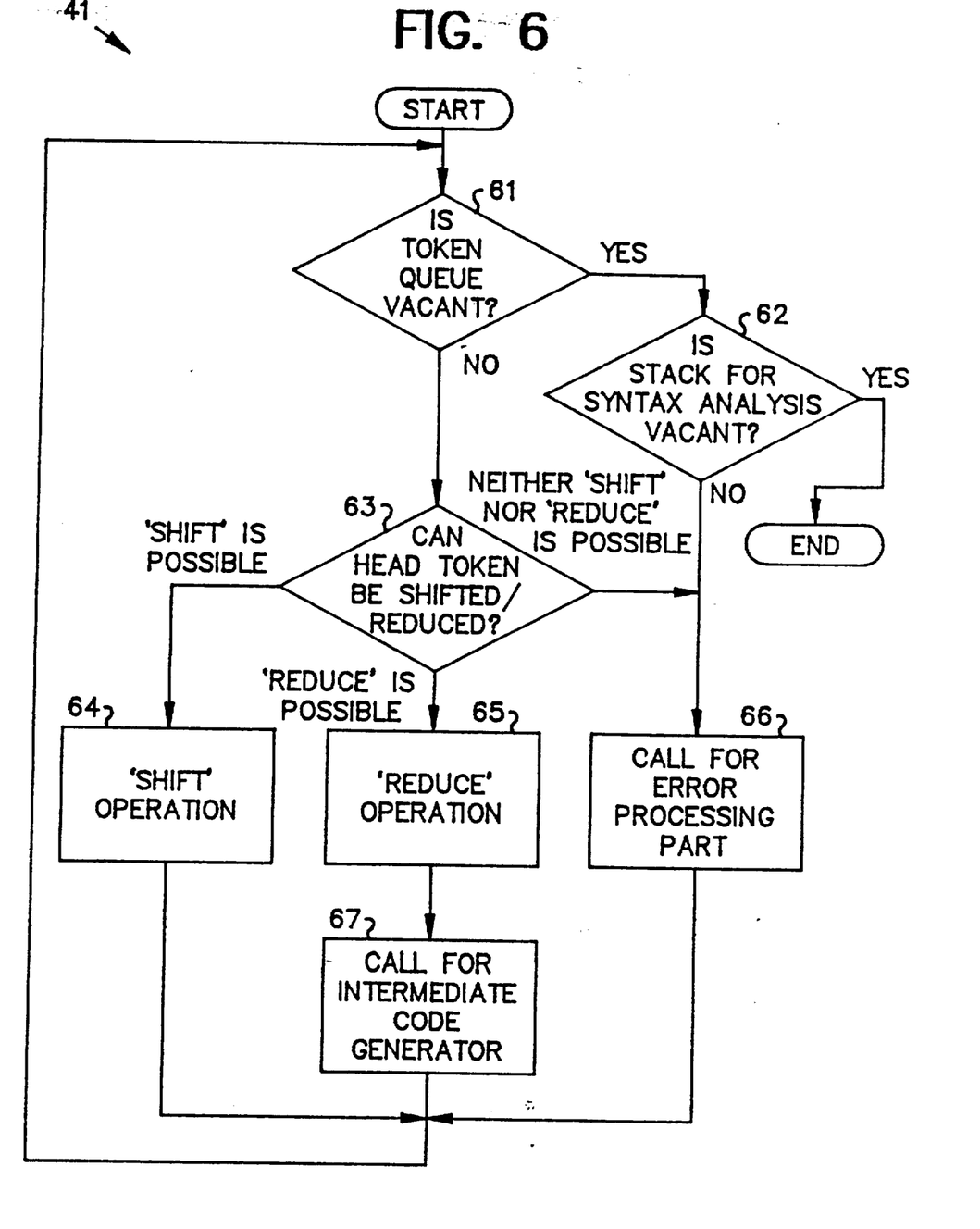
FIG. 6 is a flow chart of a parsing system.

FIG. 6 is a flow chart of the processing procedure of the parsing system. Herein a method called a shift-reduce method of bottom-up syntax analysis is employed. Details and terminology of this method are well known by those of ordinary skill in the art. Accordingly, an explanation will be made herein only on the aspect relating to the characteristic features of the present invention.

First, it is checked at a step 61 whether the token queue 3 is vacant, and when the queue is vacant, it is checked further at a step 62 whether the stack 5 for syntax analysis is vacant. When the stack is vacant, this means that an entire input token string has been analyzed successfully, and therefore processing is ended. A syntax error is indicated in the event that the stack 5 is not vacant. Under such a condition, the error processing system 42 is called (step 66).

When the token queue 3 is not vacant, the token at the head thereof is checked to determine whether the token can be shifted, or whether "reduce" can be executed by the token (step 63). When neither "shift" nor "reduce" can be executed, a syntax error is present. Under this condition the error processing system is called. When "shift" can be executed, a shifting operation, i.e., an operation of taking the head token out of the token queue and pushing it to the stack 5 for syntax analysis, is conducted, and a return is made to step 61.

When "reduce" can be executed, on the other hand, an advance is made to a step 65, and a reducing operation, i.e., an operation of replacing a symbol string at a stack top by a non-terminal symbol on the left side of BNF generating the symbol string, is conducted.

Next, the intermediate code generator 43 is called at a step 67 and a return is made likewise to step 61. When the processing in the error processing system is ended, an advance is made likewise to step 61, and processing is repeated.

In a situation wherein the shifting operation is executed at step 64, it is only necessary to push an element (a token and an indentation level paired with it) taken out of the token queue to the stack as it exists. In the case of the reducing operation at step 65, in contrast, it is determined whether the symbol string to be reduced is in conformity with the indentation rule. When it is not in conformity therewith, an error information is outputted. This operation will be described by using FIG. 7.

Figure 7A:
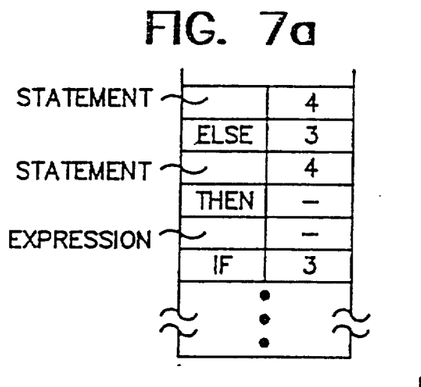

It will be assumed that the contents of the stack for syntax analysis are in such a state as shown in FIG. 7(a), and that the head element of the token queue is "end." The reducing operation is suitably conducted at this time. The symbol string from "if" to <statement> in the stack can be reduced to one <statement> by using rule (14) of the BNF of FIG. 2. It is determined whether the list of symbols from "if" to <statement> is in accord with the indentation rule (12) of FIG. 3. The indentation rule (12) indicates that the levels of "if" and "else" must be equal, and that the levels of two <statements> must be higher by one level than the above levels. In the actual stack, these levels are 3, 3, 4, 4, and therefore they are found to be in accord with this rule.

Figure 7B:
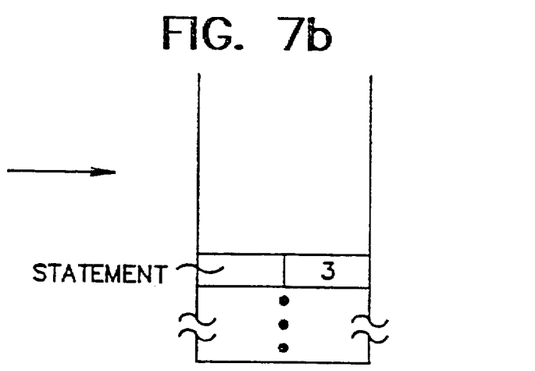
Figure 7C:
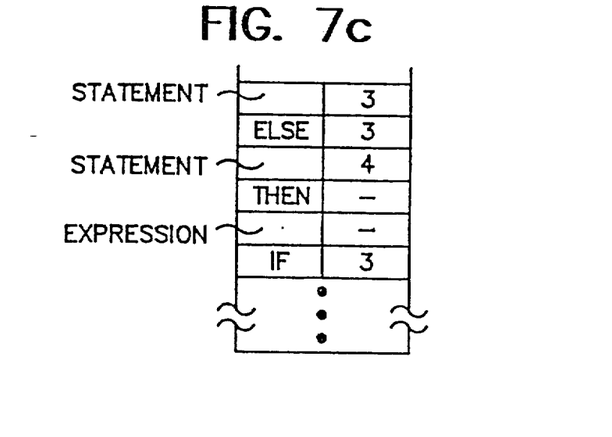

Next, the level of the whole of <statements> is calculated to be 3, and a state as shown in FIG. 7(b) appears after "reduce" is executed. When the contents of the stack for syntax analysis are as shown in FIG. 7(c), on the other hand, they violate the indentation rule, although they can be reduced as well. In this case, a warning message is outputted to the message file 7.

Figure 8:
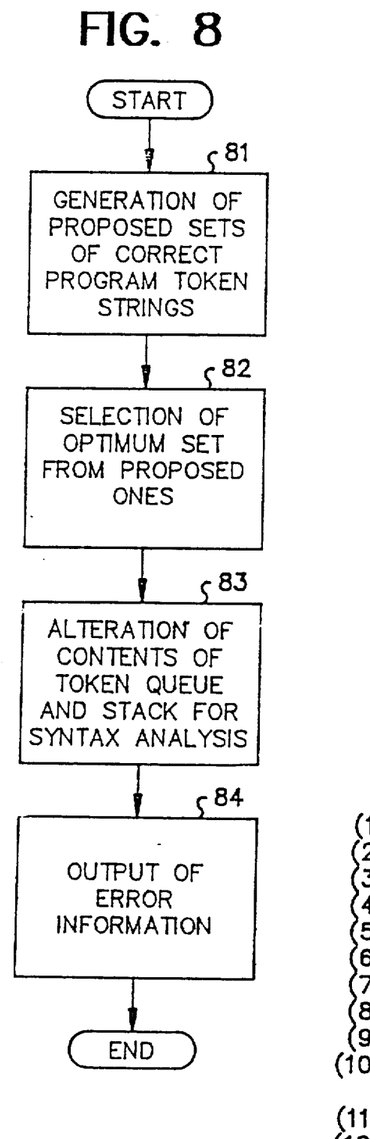
FIG. 8 is a flow chart of an error processing system.

Next, the processing in the error processing system 42 will be described by using the flow chart of FIG. 8. First, proposed sets of correct program token strings are generated at a step 81. This is based on the assumption that a token string slightly different from an input token string being analyzed currently, is a correct input token string intended by a programmer. According to this method, the sets of token strings forming a supposedly correct program are determined on the basis of the current token queue and the contents of the stack for syntax analysis. When the token strings in the token queue are expressed as $t_1, t_2, t_3, t_4 \ldots$ ($t_1$ is the head), the proposed sets are suitably generated by such methods as (i) insert another token t in front of $t_1$, (ii) delete $t_1$, (iii) replaces $t_1$ by another token t, (iv) exchange $t_2$ with $t_1$, (v) combine $t_1$ and $t_2$ into one token, etc.

The above-stated alterations are also suitably applied to tokens which have already been taken out of the token queue and so are not present therein, because the content of the token queue can be restored in some degree from the contents piled in the stack 5 for syntax analysis. There are descriptions on various techniques for lessening the number of the proposed sets generated, in the documents exemplified for examples known publicly, and they are suitably applied to the present embodiment as well.

Next, at a step 82, the set regarded as optimum is selected from those proposed. This selection is conducted by a method wherein the alteration cost for altering the original token string to a correct one is calculated by a cost function, so as to provide selection of a string for which the cost is minimized. As to the way of setting the cost function, a suitable method is known, for instance, wherein the cost for inserting a token, the cost for deleting it, etc. are determined beforehand for each token. The sum of the costs for these operations (insertion and deletion) required for the alteration are taken as whole in calculating the alteration cost. In addition to these operations, an evaluation is conducted, in the present embodiment, as to whether a generated token string conforms to the indentation rule. When it is not in conformity with the indentation rule, the cost is increased so that such an alteration as conforms to the indentation rule be selected with priority.

Next, at a step 83, the contents of the token queue 3 and the stack 5 for syntax analysis are altered so that the selected token string is put in a state of being processed. Lastly, at a step 84, the detection of a syntax error and the procedure for error recovery processing, as the result, are outputted or written as error information to the message file 7.

Figure 9:
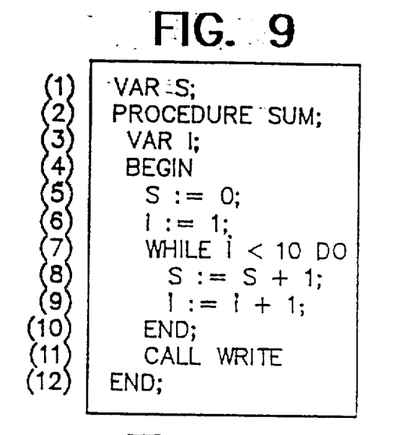
FIG. 9 is an illustration of an example of a program containing a syntax error.
Figure 10A:
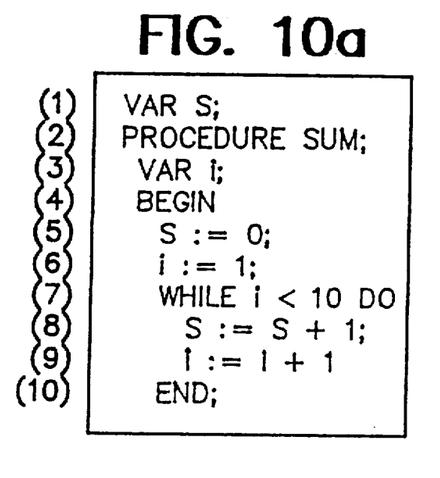
Figure 10B:
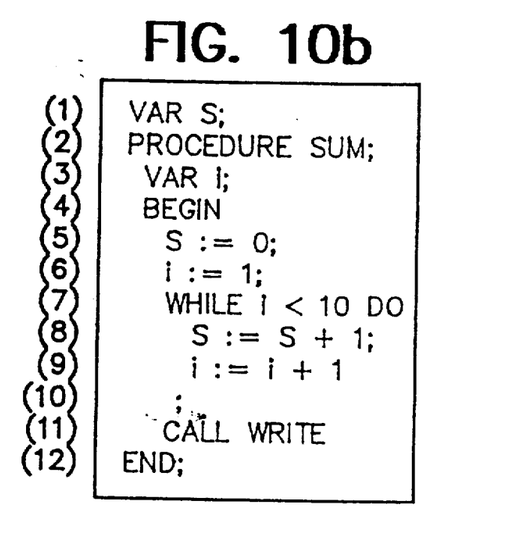
Figure 10C:
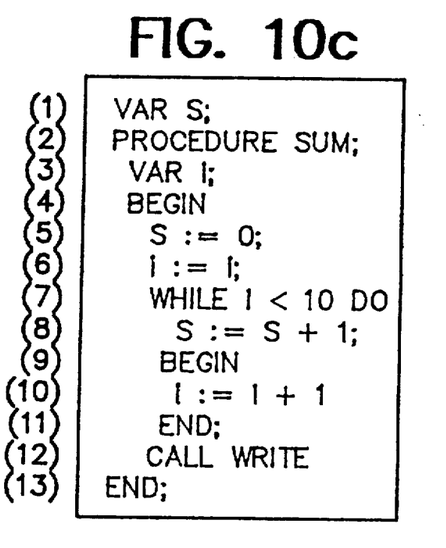
FIG. 10, which consists of FIGS. 10(a)–10(b), is an illustration of proposed correct programs.
Figure 10D:
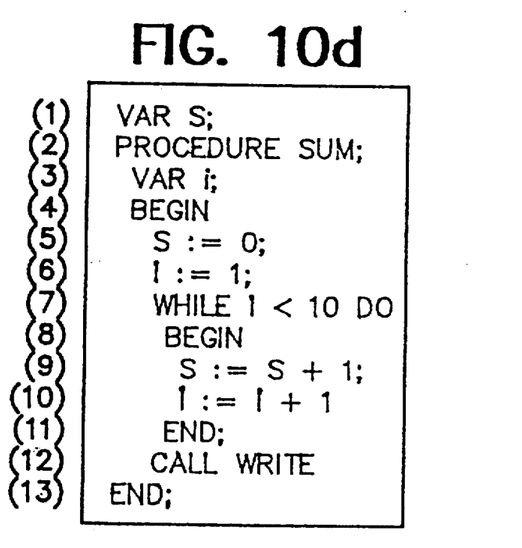

Next, an example of this process will be described by using FIGS. 9 and 10. A program of FIG. 9 is written by the programming language shown by the syntax rule of FIG. 2, and it contains a syntax error. For any person having an experience of programming, it is easy to suppose from the way of giving indentations that the error is caused by the absence of a "begin" corresponding to an "end" on the tenth line.

In an ordinary syntax analysis wherein the program is checked from the head, however, "end" on the tenth line is regarded as corresponding to "begin" on the fourth line, and accordingly, the error is detected first at a point of time when "call" on the eleventh line is read. In the syntax analyzer of the present embodiment, therefore, the control is transferred from the parsing system 41 to the error processing system 42 at this point of time. In the error processing system, first, proposed correct program token strings are generated at step 81. These proposed strings are shown in FIG. 10.

In FIG. 10, however, tokens are not written in the form of a token string, but are instead written in the form of a program. For ease in visualization, an entire program is shown therein. The proposed sets generated in this case include a set wherein tokens on the eleventh line and after are all deleted (FIG. 10(a)); a set wherein "end" on the tenth line is deleted ((b) of the same figure); a set wherein "begin" is inserted in front of the ninth line ((c) of the same figure); a set wherein "begin" is inserted in front of the eighth line ((d) of the same figure); etc.

Next, at step 82, the costs of these alterations are determined. Assuming that the cost for alteration of one token is 1 both in insertion and deletion, the costs for alterations in (a) to (d) are 5, 1, 1, and 1, respectively. When collated with the indentation rule, moreover, (a) is contrary to rules (11) and (15) of FIG. 3, (b) and (c) are contrary to rule (15), while (d) is in conformity with the rules. Thus, (d) is to be selected finally. Next, the contents of the token queue and the stack for syntax analysis are returned to a state wherein (d) is to be processed, at step 83. Lastly, at step 84, an error message is outputted advising that "begin" has been inserted to continue the current analysis although a syntax error has been detected. Thereafter the processing is ended.

According to the present embodiment, as is seen from the examples shown in FIGS. 9 and 10, a more accurate and appropriate measure can be taken for the syntax error. The way of setting indentations, as well as the one-dimensional list of tokens relating to a program are used as a hold for recovery from the error. When the program is written in conformity with the prescribed indentation rule, the program can be restored without fail to one close to the intention of the writer thereof and the syntax analysis can be continued, even when an syntax error takes place. According to the present embodiment, moreover, a warning can be given to a program which is in violation to the indentation rule although in conformity with the syntax rule, as is shown previously. For instance, a program shown in FIG. 11(a) does not contain any error in terms of syntax, but the ninth line thereof violates the prescribed indentation rule. The writer of this program may have desired to show by indentation that it is two lines of the eighth and the ninth that are repeated by a "while" statement. But conventional compilers are not well-designed enough to interpret which statement is desired by the writer, and they erroneously conclude that the eighth line is alone to be repeated by the "while" statement, and the ninth line is concluded to be a statement to be executed only one time in succession to the repetition.

Figure 11A:
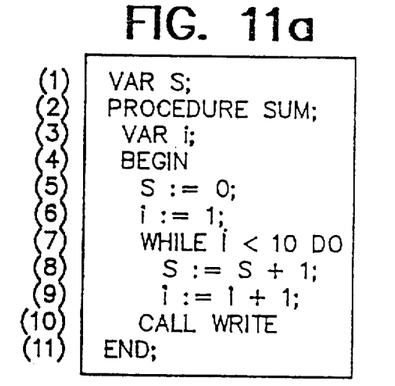
Figure 11B:
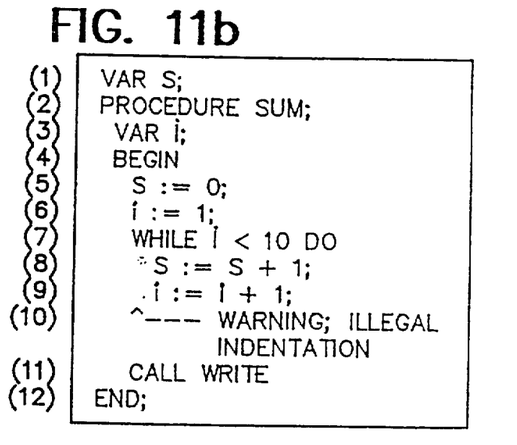

In the compiler of the present embodiment a warning message, such as the one shown in FIG. 11(b), is given. It is also advantageous to control the function of giving this message, as an option for the compiler.

While the shift-reduce method in the bottom-up syntax analysis methods is employed as a technique of syntax analysis at an ordinary time in the present embodiment, the present invention is not limited to it. The same effect may be produced, for instance, by using a non-recursive, top-down method wherein the stack for syntax analysis is used similarly. By designing an element of the stack for syntax analysis to be represented by a token and an indentation level paired with it in the same way as in the present embodiment, the state of indentations of the program can be known beforehand, and thereby such an error recovery as conforming to the indentation rule, can be executed in the same way as in the present embodiment.

In the present embodiment, the method wherein an appropriate modification is given to an input token string to restore an (expectedly) correct program, and thereby to continue the syntax analysis, is adopted as the method of error recovery. The present invention is not limited, however, to the above method.

The present invention is also suitably applied to a method for error recovery which is often used in top-down syntax analysis methods which is often referred to a panic mode recovery method or a follow-set-recovery method. Such methods are well within the understanding of one of ordinary skill in the art.

In these methods, a set of tokens (called synchronous tokens as well) to be moments of a restart of an analysis processing are determined when any error is detected. Then, an input token is skipped over if it is not contained in the set, and the syntax analysis is restarted from a point of time when a token contained in the set appears. When the subject teachings are applied to this system, the set of the synchronous tokens has pairs of tokens and indentation levels thereof as elements. When an error is detected, the program is skipped over until the appearance of such a token as having a certain indentation level occurs.

It is possible that processing after the restart of the syntax analysis is varied according to the indentation levels of tokens even if the tokens are identical. The indentation rule (and the syntax rule) of FIG. 3(12) is considered, herein by way of example. In the case when any error is detected while the part of <condition> is analyzed, such tokens as "then," "else," etc. are contained in the set of synchronous tokens according to the follow-set-recovery method. Processing after recovery is varied naturally according to whether an "else" which appears has the same indentation level with that of an "if" which has already been processed. When it has the same indentation level as "if," the "else" is regarded as belonging directly to the "if" statement currently being processed. When it has not, the "else" is regarded as belonging to another "if" statement located in an upper of lower structure. Since the indentation level of each token is stored as occasion demands in the present invention, discrimination in cases such as those stated above can also be realized.

Lastly, the format of description in the indentation rule description file in the present invention is not limited to the method based on a BNF description method, which is shown in FIG. 3. For instance, a format may be used wherein such a program makes it possible to know indentation rules of a programming language, and serves as a simple example to be written beforehand in the indentation rule description file. In this case, the indentation rule table generator extracts the characteristic features of the indentation scheme from the program and generates an indentation rule table. Another method may also be used wherein the indentation scheme is given as a reply on a reply-to-question basis. In such a form, determination of what indentation is applied to a given syntax is made and the contents of the reply are recorded in the indentation rule description file. The use of these methods produces an effect that the way of indentations can meet the demand of a user who is not acquainted with such a special method of description as BNF.

Figure 12:
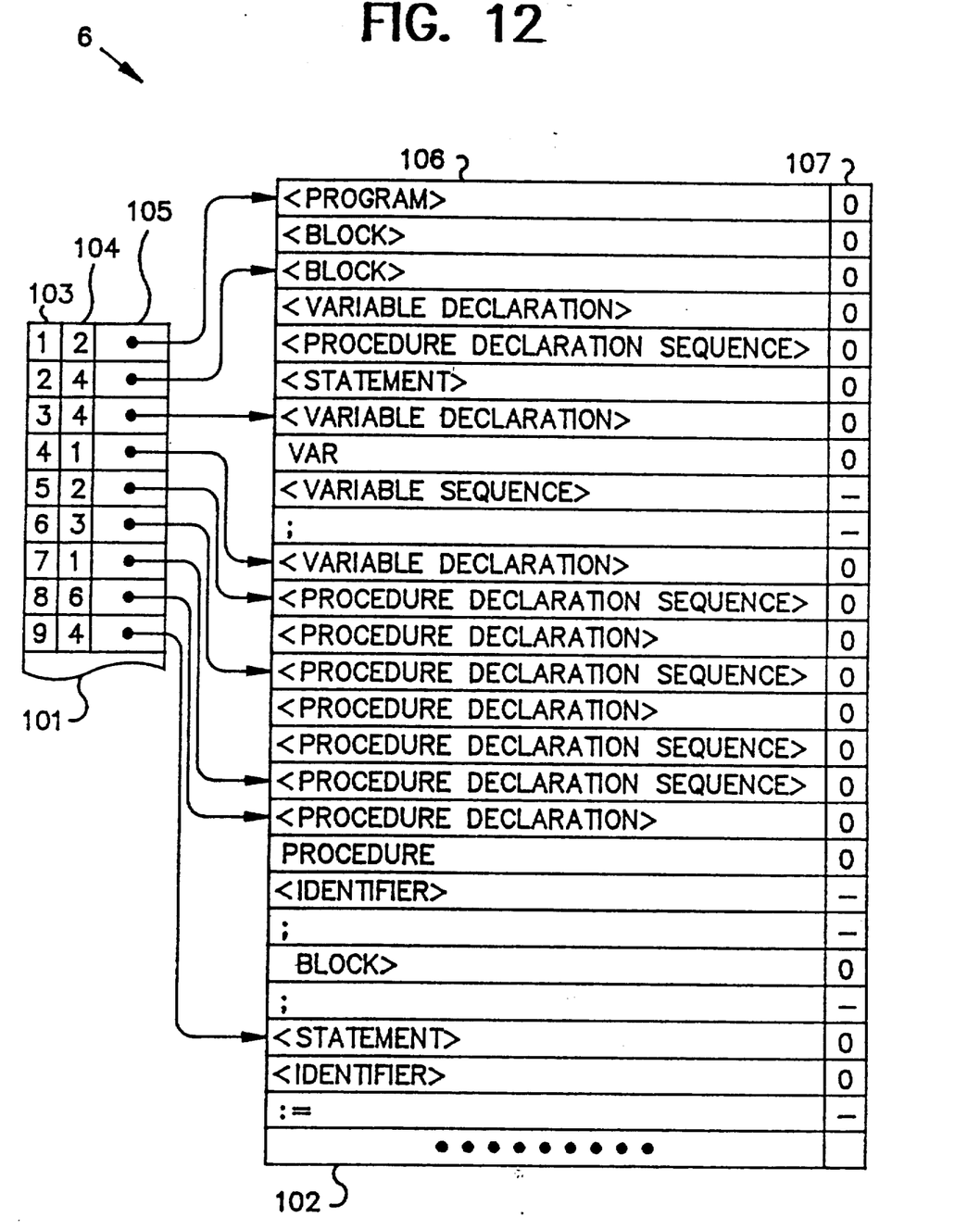
FIG. 12 is an illustration of an instance of an indentation rule table as used in the subject application.

FIG. 12 illustrates an instance of an indentation rule table 6. In this embodiment, an indentation rule table includes a management table 101 and a rule description table 102. For each indentation rule, the following information is stored in an entry of management table 101: a rule number 103, a number 104 of symbols involved in the rule, and a pointer 105 to a unit of the rule description table 102. A unit of the rule description table is a list of symbol entries, each of which consists of a name 106 and an indentation level 107 of a symbol, arranged in order of appearance in an indentation rule.

According to the present invention, as described above, the recovery from a syntax error is attained by supposing a correct program from the indentation scheme of a given program and by restoring same, when the error is detected. Therefore, a more accurate and appropriate measure can be taken than in the case when the error recovery is conducted by regarding the program simply as the one-dimensional list of symbols. Additionally, a proper error message can be provided to a user.

Having thus described the invention, it is now claimed:

1. A syntax analyzing method in a language processing system comprising the steps of:
 (a) receiving a sequence of symbols;
 (b) analyzing lexicons of the sequence of symbols;

(c) storing indentation information of each lexicon in a memory;

(d) analyzing syntax of the sequence of symbols, in accordance with a result achieved in step (b) to determine a presence of a syntax error; and (e) upon detection of a syntax error in step (d), completing the steps of,
- (i) generating at least one proposed sequence of symbols corresponding to a portion of the sequence of symbols which include the syntax error in accordance with indentation information stored in the memory, and
- (ii) selecting one of the at least one proposed sequence of symbols in accordance with an indentation rule table.

2. The syntax analyzing method of claim 1 wherein step (e)(i) includes the step of deleting, in accordance with stored indentation information, at least one lexicon from the portion of the sequence or symbols which includes a syntax error.

3. The syntax analyzing method of claim 1 wherein step (e)(i) includes the step of inserting, in accordance with stored indentation information, at least one lexicon into the portion of the sequence of symbols which includes a syntax error.

4. The syntax analyzing method of claim 1 wherein step (e)(ii) includes the step of selecting a proposed sequence of symbols which conform to an indentation rule stored in the indentation rule table.

5. The syntax analyzing method of claim 1 further comprising the steps of:
- (f) receiving indentation rule information from an indentation rule description file; and
- (g) generating the indentation rule table from the indentation rule information.

6. A syntax analyzing method used in a language processing system comprising the steps of:
- (a) receiving a sequence of symbols;
- (b) analyzing lexicons of the sequence of symbols;
- (c) storing, in a memory, indentation information for each lexicon;
- (d) determining whether the sequence of symbols conforms to an indentation rule stored in an indentation rule table;
- (e) testing the sequence of symbols in accordance with the indentation rule; and
- (f) communicating a message in the event that the sequence of symbols does not conform to the indentation rule in accordance with step (e).

7. The syntax analyzing method of claim 6 further comprising the steps of:
- (g) receiving indentation rule information from an indentation rule description file; and
- (h) generating the indentation rule table from the indentation rule information.

8. A syntax analyzing apparatus used in a language processing system comprising:
- means for receiving a sequence of symbols;
- indentation rule table means for storing indentation rule data;
- means for generating lexicons of the sequence of symbols;
- means for storing indentation information of each lexicon in a memory;
- syntax analyzing means for comparing lexicons of the sequence of symbols with the indentation rule data, which means includes means for generating a syntax error signal in the event that a syntax error is determined in the sequence of symbols as a result of a comparison completed therein;
- means for selectively generating at least one proposed sequence of symbols for a portion of the sequence of symbols under direction of the syntax error signal; and
- selecting means for selecting one of the proposed sequences of symbols in accordance with the indentation rule table means under direction of the syntax error signal.

9. The syntax analyzing apparatus of claim 8 wherein the means for generating a proposed sequence of symbols includes means for deleting at least one lexicon from the portion of the sequence of symbols under direction of the syntax error signal.

10. The syntax analyzing apparatus of claim 8 wherein the means for generating proposed sequences of symbols includes means for inserting at least one lexicon into the portion of the sequence of symbols under direction of the syntax error signal.

11. The syntax analyzing apparatus of claim 8 wherein the selecting means includes means for selecting a proposed sequence of symbols which conforms to the indentation rule data.

12. The syntax analyzing apparatus of claim 11, further comprising:
- indentation rule information file means for storing indentation rule generation data;
- means for communicating the indentation rule generation data to the indentation rule table means from the indentation rule information file; and
- means for generating the indentation rule data from the indentation rule generation data.

13. The syntax analyzing apparatus of claim 8 further comprising:
- means for communicating indentation rule generation data to the indentation rule table means; and
- means for generating the information rule data from the indentation rule generation data.

14. A syntax analyzing apparatus for use in a language processing system comprising:
- means for storing indentation rule data;
- means for receiving a sequence of symbols;
- means for generating lexicons from the sequence of symbols;
- means for storing indentation information corresponding to each lexicon;
- means for determining whether the sequence of symbols corresponds to the indentation rule data; and
- means for communicating a message representative of a state wherein the sequence of symbols does not correspond to the indentation rule data.

* * * * *